(12) United States Patent
Yang

(10) Patent No.: US 6,944,013 B2
(45) Date of Patent: Sep. 13, 2005

(54) COMPUTER CABINET WITH MOUNTED HARD DISK CASING AND HARD DISKS

(75) Inventor: Chang-hwan Yang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/360,750

(22) Filed: Feb. 10, 2003

(65) Prior Publication Data

US 2004/0001308 A1 Jan. 1, 2004

(30) Foreign Application Priority Data

Jun. 27, 2002 (KR) ........................................ 2002-36456

(51) Int. Cl.⁷ ................................................ G06F 1/16
(52) U.S. Cl. ..................... 361/683; 361/685; 312/223.2
(58) Field of Search .................. 361/679, 683, 361/684, 685, 686, 724, 725, 726, 727; 312/223.1, 223.2

(56) References Cited

U.S. PATENT DOCUMENTS

| | | | | |
|---|---|---|---|---|
| 5,483,419 A | * | 1/1996 | Kaczeus et al. ............ 361/685 |
| 5,564,804 A | * | 10/1996 | Gonzalez et al. ........ 312/223.2 |
| 5,768,099 A | | 6/1998 | Radloff et al. .............. 361/685 |
| 5,995,364 A | | 11/1999 | McAnally et al. .......... 361/685 |
| 6,018,457 A | | 1/2000 | Mroz ......................... 361/685 |
| 6,025,987 A | | 2/2000 | Allirot et al. ............... 361/685 |
| 6,141,222 A | * | 10/2000 | Toor et al. ................... 361/726 |
| 6,238,026 B1 | * | 5/2001 | Adams et al. ........... 312/223.2 |
| 6,272,008 B1 | * | 8/2001 | Huang ........................ 361/683 |
| 6,337,793 B1 | * | 1/2002 | Vier et al. .................. 361/683 |
| 6,377,447 B1 | | 4/2002 | Boe ........................... 361/685 |

FOREIGN PATENT DOCUMENTS

| | | |
|---|---|---|
| KR | 1995-0005200 | 6/1995 |
| KR | 1999-0015965 | 5/1999 |
| KR | 20-0179501 | 2/2000 |
| KR | 2000-0011854 | 7/2000 |
| KR | 2001-0001643 | 1/2001 |

* cited by examiner

Primary Examiner—Chau N. Nguyen
Assistant Examiner—Carmelo Oliva
(74) Attorney, Agent, or Firm—Staas & Halsey LLP

(57) ABSTRACT

A computer having a main cabinet to which a hard disk drive can be mounted easily and quickly, comprises a hard disk casing having a support bracket with an opening and a movable bracket. The support bracket is installed on the main cabinet, and receives at least one hard disk drive through the opening. The movable bracket closes at least a part of the opening of the support bracket and comprises a hinge part movably supporting the movable bracket relative to the support bracket, and at least one first supporting projection projected from a plane of the movable bracket toward the opening and inserted into a first screw hole provided in a first side of the hard disk drive at a closing position of the movable bracket to support the hard disk drive.

26 Claims, 9 Drawing Sheets

COMPUTER CABINET WITH MOUNTED HARD DISK CASING AND HARD DISKS

CROSS-REFERENCE TO RELATED APPLICATIONS

This application claims the benefit of Korean Application No. 2002-36456 filed Jun. 27, 2002, in the Korean Intellectual Property Office, the disclosure of which is incorporated herein by reference.

BACKGROUND OF THE INVENTION

1. Field of the Invention

The present invention relates to a computer, and more particularly, to a computer having a hard disk casing whose mounting structure is improved.

2. Description of the Related Art

Computers are classified into a tower-type computer and a desktop-type computer according to a shape of a main frame (main cabinet) of a main body of the computer.

Generally, the respective main cabinets of the tower-type computer and the desktop-type computer comprise a front panel constituting the front part of the main cabinet, a rear panel constituting the rear part of the main cabinet and having a plurality of connector-inserting holes, and a support panel connecting the front panel and the rear panel therebetween, forming a receiving space inside the main cabinet. Herein, in comparison of the width and the height of the main cabinet, if the width of the main cabinet of the computer is larger than the height thereof, the computer is called a desktop-type computer, but if the height of the main cabinet of a computer is larger than the width thereof, the computer is called a tower-type computer. Hereunder, the present invention will be described with reference to the tower-type computer, which will be referred to as "computer" in a simple manner.

As shown in FIG. 1, a conventional computer comprises a main body 100 having several hardware components in communication with each other, such as a hard disk drive 3, a processing unit (not shown), a monitor (not shown) displaying pictures thereon in response to the picture signals transmitted from the main body 100, and input devices (not shown) inputting predetermined information into the main body 100, including a keyboard (not shown) and a mouse (not shown), etc.

The main body 100 comprises a main cabinet 113 formed with a front panel 114 constituting the front thereof, a rear panel 115 constituting the rear thereof and having several connector-inserting holes, and a support panel 116 connecting the front panel and the rear panel therebetween, forming a receiving space inside thereof, and an opening in one side thereof, a cover 112 opening and closing the opening of the main cabinet 113, and a front cover 111 defining the frontal appearance of the main body 100 and being formed with an opening 111a through which auxiliary storage devices such as a compact disk drive (not shown) or a floppy disk drive (not shown) are exposed outside toward the front of the main body 100.

Inside the main cabinet 113 are installed a main board or processing unit (not shown) equipped with the central processing unit (CPU) and hardware components, such as a hard disk drive 3, and a power supply (not shown) supplying power to the computer. The hard disk drive 3 is electrically connected to the main board (not shown), storing therein data from the CPU. A hard disk casing 200 receives therein the hard disk drive 3, and is mounted on the main cabinet 113.

In FIG. 2, the conventional hard disk casing 200 is formed of steel and takes the form of a rectangular box so as to receive the hard disk drive 3 therein. The hard disk casing 200 is generally formed with a receiving space sufficient to receive two hard disk drives 3 therein.

On both side walls of the hard disk casing 200 are formed a plurality of screw-passing holes 210 to allow engagement of screws 119a with a plurality of screw holes 3a, formed with screw threads inside thereof, provided at predetermined intervals on both sides of the hard disk drive 3.

The hard disk casing 200 comprises a pair of skirt parts 220, formed by outwardly bending both ends of the side walls of the casing 200, and a plurality of mounting holes 230, formed on planes of the skirt parts 220. The hard disk casing 200 is coupled to screw holes 117, provided in the main cabinet 113, through the mounting holes 230 by screws, 117a thereby mounting the hard disks 3 onto the main cabinet 113 of the computer.

With this configuration, a conventional process of installing the conventional hard disk drive 3 on the main cabinet 113 will be described next. The hard disk drive 3 is inserted into the hard disk casing 200 and then the screws 119a pass through the screw passing holes 210 provided in the hard disk casing 200. The screws 119a are jointed to the screw holes 3a of the hard disk drive 3, thereby supportably receiving the hard disk drive 3 in the hard disk casing 200. Then, the hard disk casing 200 receiving therein the hard disk drive 3 is placed inside the main cabinet 113, and the screws 117a pass through the mounting holes 230 provided in the skirt parts 220 of the hard disk casing 200. The screws 117a are jointed to the screw holes 117 of the main cabinet 113, thereby completing the process of mounting the hard disc casing 200 in the main cabinet 113.

However, the conventional computer requires a multiplicity of screws 119a and 117a for installing the hard disk drive 3 on the hard disk casing 200 and for mounting the hard disk casing 200 on the main cabinet 113, increasing hard-disk mounting time, decreasing computer manufacturing and maintenance productivity, and increasing production costs thereof. In addition, when a user detaches the hard disk drive 3 from the main cabinet 113 to replace or repair the hard disk drive 3, a screw driver (not shown) has to be used. In this case, idling of the screw driver (not shown) may cause a cross head or flat head of the screw to be worn, and small screws may be easily lost, therefore, detachment of the hard disk drive 3 can unnecessarily become difficult, frustrating simple user maintenance of the computer.

SUMMARY OF THE INVENTION

Accordingly, it is an object of the present invention to provide a computer allowing hard disk drive mounting and/or detaching on/from a main cabinet of the computer in an easy and simple manner.

Additional objects and advantages of the invention will be set forth in part in the description which follows and, in part, will be obvious from the description, or may be learned by practice of the invention.

The foregoing and other objects of the present invention are achieved by providing a computer having a main cabinet to which a hard disk drive is mounted, comprising a hard disk casing having a support bracket and a movable bracket, the support bracket installed on the main cabinet and having an opening receiving at least one hard disk drive, and the movable bracket closing at least a part of the opening of the support bracket; a hinge part movably supporting the movable bracket relative to the support bracket; and at least a first supporting projection projected from the plane of the movable bracket, being inserted into a first screw hole provided in a first side of the hard disk drive at a closing position of the movable bracket to support the hard disk drive.

According to an aspect of the invention, the computer further comprises a locking part installed between the support bracket and the movable bracket, locking and releasing the movable bracket relative to the support bracket.

According to an aspect of the invention, the locking part comprises a first coupling piece extended toward the support bracket from an edge of the movable bracket, formed/positioned with a hooking portion on a plane of the first coupling piece; and a second coupling piece installed on the support bracket, formed with an engagement rib and engaged with the hooking portion at the closing position of the movable bracket.

According to an aspect of the invention, the hooking portion comprises a through hole formed on the plane of the first coupling piece.

According to an aspect of the invention, a releasing through hole is provided on the plane of the support bracket on a region that the hooking portion and the engagement rib are engaged, and at least one of the first coupling piece and the second coupling piece is elastically bent toward the releasing through hole so as to release the hooking portion from the engagement rib.

According to an aspect of the invention, the computer further comprises at least a second supporting projection projected from a plane of the support bracket, inserted into a second screw hole provided in a second side of the hard disk drive, thereby supporting the hard disk drive.

According to an aspect of the invention, the computer further comprises a buffering member provided in respective regions that the movable bracket and the support bracket contact the first and the second sides of the hard disk drive.

According to an aspect of the invention, the buffering member comprises rubber.

According to an aspect of the invention, the computer further comprises a grip installed on the movable bracket.

According to an aspect of the invention, the computer further comprises at least a supporting rib installed on the movable bracket, supporting in a contact manner the hard disk drive at the closing position.

According to an aspect of the invention, the computer further comprises a hooking part installed on a plane of one of the support bracket and the main frame; a hooking hole formed on a plane of one of the support bracket and the main cabinet, corresponding to hooking part and receiving the hooking part, allowing the support bracket to be slidably engaged into an installation position thereof relative to the main cabinet; and a stopper installed on the main cabinet and preventing sliding of the support bracket after the support bracket is positioned at the installation position.

According to an aspect of the invention, the hooking part is installed on the main cabinet, the hooking part comprising a flange-supporting rib installed along a sliding direction of the support bracket and a flange part extended from the flange-supporting rib transversely to the sliding direction of the support bracket, and the hooking hole is formed on the support bracket, the hooking hole comprising a flange insertion hole formed on the support bracket, through which the flange part can be inserted, and a flange engaging hole extended from the flange insertion hole in the sliding direction of the support bracket, allowing the support bracket to be slid and engaged with the flange part.

According to an aspect of the invention, the stopper comprises a bracket-supporting plate in contact with the support bracket at the installation position of the support bracket, thereby preventing sliding of the support bracket; and a rotation-supporting part rotatably supporting the bracket-supporting plate between a contact position of the bracket-supporting plate and the support bracket and a separating position thereof.

According to an aspect of the invention, the stopper further comprises a hook part projected toward the main cabinet from the bracket-supporting plate; and a hook-coupling hole formed on the main cabinet, the hook-coupling hole being engaged with the hook part at the contact position of the bracket supporting plate.

According to another aspect of the present invention, the foregoing and other objects of the invention may be also achieved by providing a computer having a main cabinet to which a hard disk drive is mounted, comprising a hard disk casing having an opening and receiving therein at least a hard disk drive; a hooking part installed on a plane of one of the hard disk casing and the main cabinet; a hooking hole formed on a plane of one of the hard disk casing and the main cabinet, corresponding to the hooking part and receiving the hooking part, thereby allowing the hard disk casing to slide to an installation position on the main cabinet; and a stopper installed on the main cabinet and preventing sliding of the hard disk casing after the hard disk casing is slid to the installation position.

According to an aspect of the invention, the hooking part is installed on the main cabinet, the hooking part comprising a flange-supporting rib installed in a sliding direction of the hard disk casing and a flange part extended from the flange-supporting rib transversely to the sliding direction of the hard disk casing, and wherein the hooking hole comprises a flange insertion hole formed on the hard disk casing, through which the flange part can be inserted, and a flange engaging hole extended from the flange insertion hole in the sliding direction of the hard disk casing, allowing the hard disk casing to be slid and engaged with the flange part.

According to an aspect of the invention, the stopper comprises a bracket-supporting plate in contact with the hard disk casing at the installation position of the hard disk casing, thereby preventing sliding of the hard disk casing; and a rotation-supporting part rotatably supporting the bracket-supporting plate between a contact position of the bracket supporting plate and the hard disk casing and a separating position thereof.

According to an aspect of the invention, the stopper comprises a hook part projected toward the main cabinet from the bracket-supporting plate; and a hook-coupling hole formed on the main cabinet, the hook-coupling hole being engaged with the hook part at the contact position of the bracket-supporting plate.

According to an aspect of the invention, the rotation supporting part comprises a movable pin provided on one of the stopper and the main cabinet; and a movable-pin receiving part provided on other one of the stopper and the main cabinet corresponding to and receiving the movable pin so as to allow the stopper to be rotated relative to the main cabinet.

According to an aspect of the invention, the computer further comprises at least a guide rib installed on the main cabinet, guiding the hard disk casing when the hard disk casing is slid to the installation position.

BRIEF DESCRIPTION OF THE DRAWINGS

At least the above and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
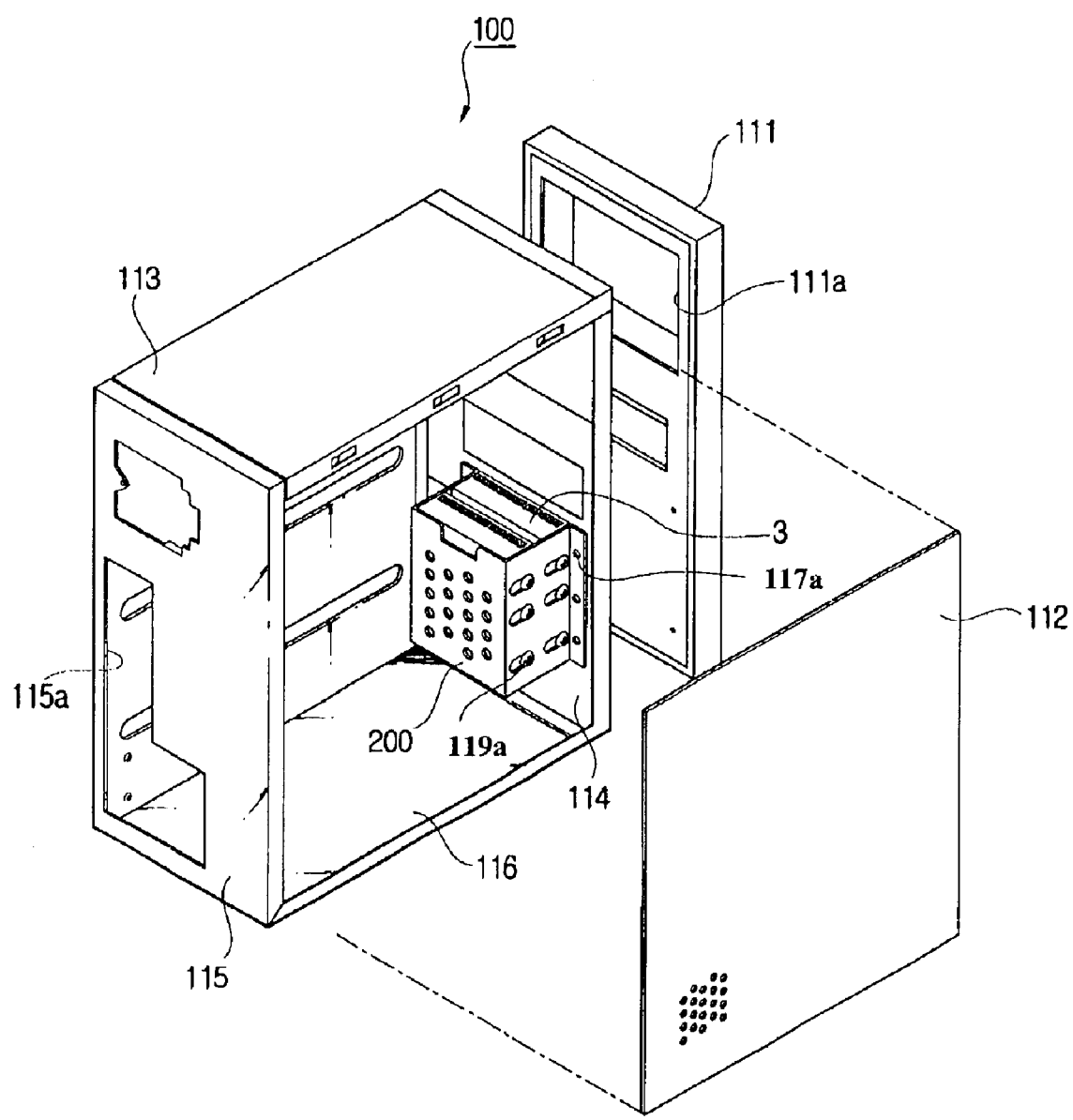
FIG. 1 is an exploded view of a conventional computer.

Reference will now be made in detail to the present embodiments of the present invention, examples of which are illustrated in the accompanying drawings, wherein like reference numerals refer to the like elements throughout.

Figure 3:
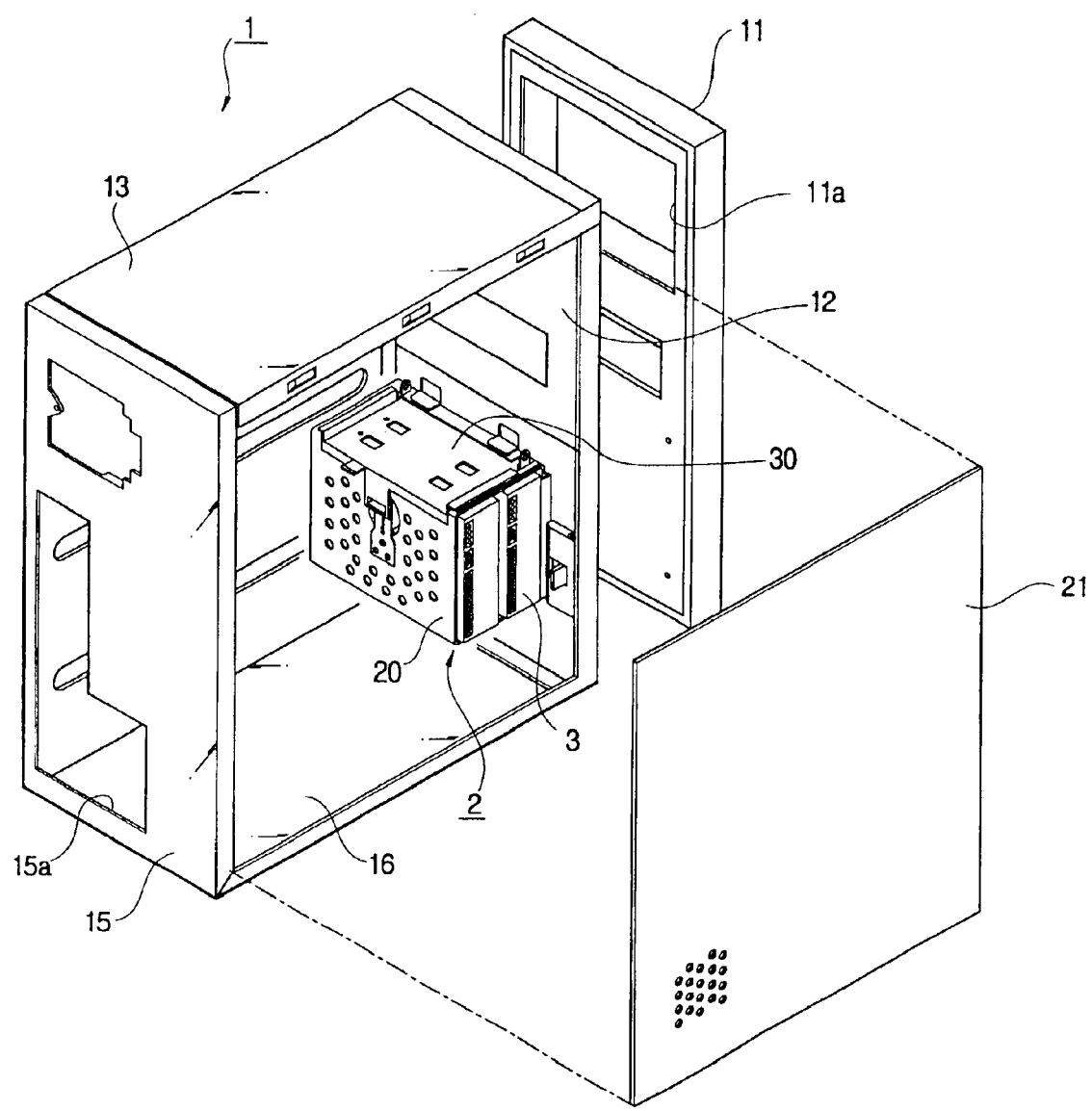
FIG. 3 is an exploded view of a computer with a hard disk casing, according to an embodiment of the present invention.

In FIG. 3, a computer according to an embodiment of the present invention comprises a main body 1 having several hardware components in communication with each other, such as a hard disk drive 3, a processing unit (not shown), a monitor (not shown) displaying thereon pictures based on picture signals transmitted from the main body 1, and input devices inputting predetermined information into the main body 1, the input devices including a keyboard (not shown) and a mouse (not shown), etc.

The main body 1 comprises a main cabinet 13 provided with a front panel 12 constituting the front thereof, a rear panel 15 constituting the rear thereof and having several connector-inserting holes, and a support panel 16 connecting the front panel and the rear panel therebetween, forming a receiving space inside thereof, and an opening in one side thereof, a cover 21 opening and closing the opening of the main cabinet 13, and a front cover 11 defining the front appearance of the main body 1 and having an opening 11a through which auxiliary storage devices such as a compact disk drive (not shown) or a floppy disk drive (not shown) are exposed outside toward the front of the main body 1.

Figure 2:
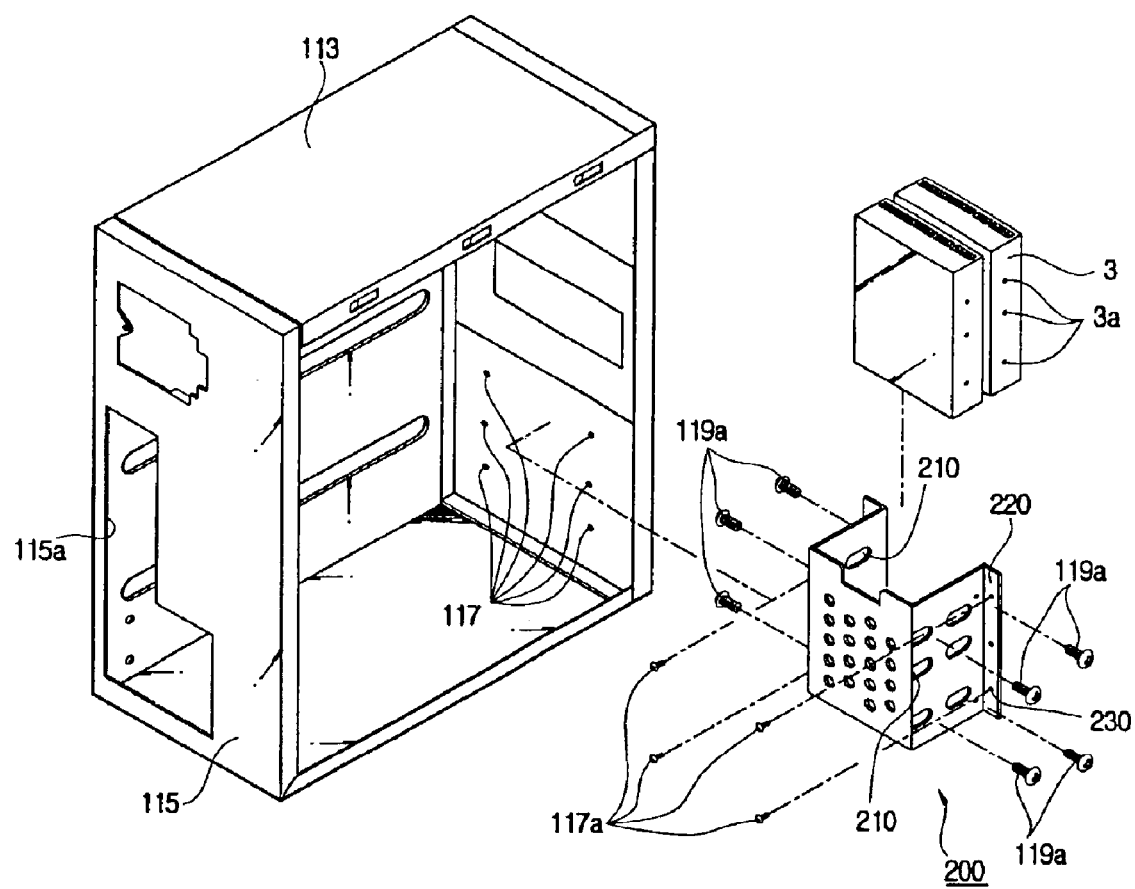
FIG. 2 is a diagram showing a hard disk drive mounted to the conventional computer in FIG. 1.

Inside the main cabinet 13 are installed a main board or processing unit (not shown) equipped with a central processing unit (CPU) and hardware components, such as the conventional hard disk drive 3 as shown in FIG. 2, and a power supply (not shown) supplying power to the computer. The hard disk drive 3 is electrically connected to the main board (not shown), storing therein data from the CPU. A hard disk casing 2 of the invention receives therein the hard disk drive 3 and is mounted on the main cabinet 13. Typically, on both sides of the hard disk drive 3 are provided a plurality of screw holes 3a at predetermined intervals, formed with screw threads inside thereof. According to an aspect of the invention, three screws holes 3a are formed on each side of the hard disk drive 3.

Figure 4:
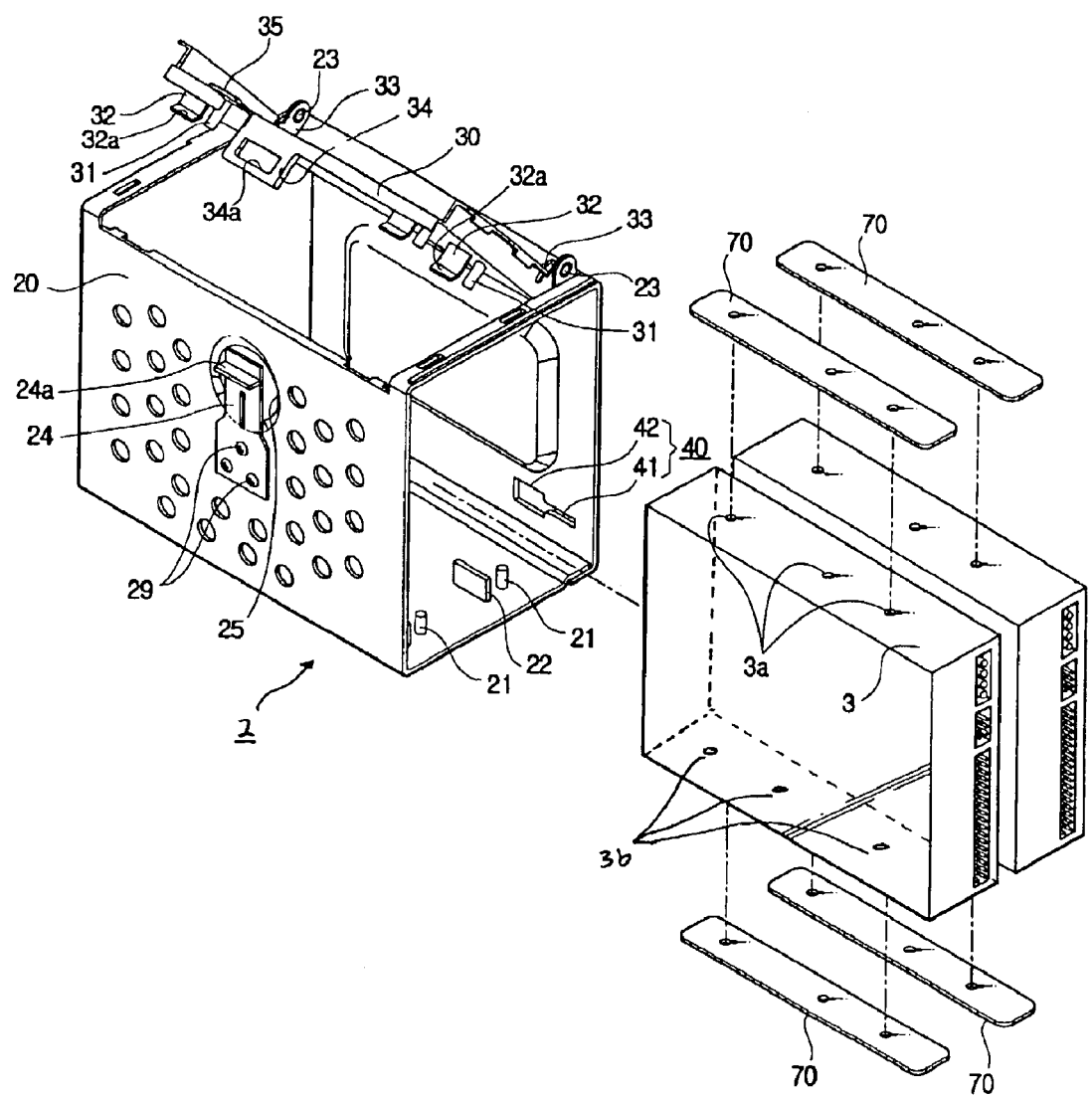
FIG. 4 is a perspective view of the hard disk casing shown in FIG. 3.
Figure 5:
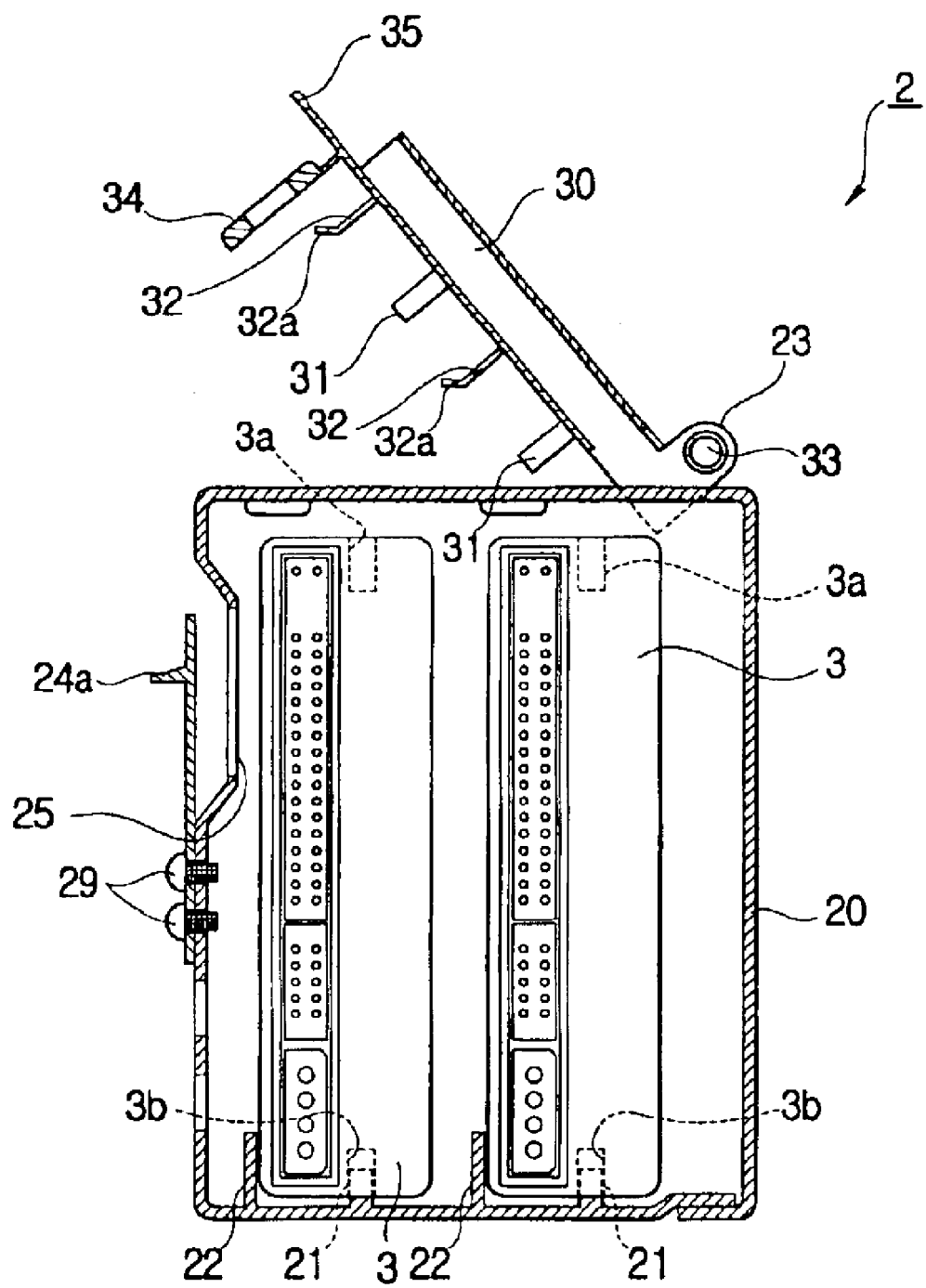
FIG. 5 is a side sectional view of the hard disk casing of FIG. 3 receiving therein hard disk drives.

The hard disk casing 2, as shown in FIGS. 3, 4 and 5, comprises a support bracket 20 having an opening on its top plane (upper opening), a movable bracket 30 closing at least a part of the opening of the support bracket 20, hinge parts 23 and 33 movably supporting the movable bracket 30 relative to the support bracket 20, and at least one first supporting projection 31 projected at predetermined intervals from the plane of the movable bracket 30.

On the support bracket 20 are formed the upper opening opened and closed by the movable bracket 30 and a front opening through which the hard disk drive 3 can be inserted and drawn. The support bracket 20 takes the form of an approximately rectangular parallelepiped whose inside is hollow, so as to receive therein at least one hard disk drive 3. According to an aspect of the invention, only the upper opening can be provided in the support bracket 20, and the hard disk drive 3 can be inserted into or drawn from the hard disk casing 2 through the upper opening.

The hinge parts 23 and 33 movably support the movable bracket 30 so as to move the movable bracket 30 between a closing position to close the upper opening of the support bracket 20 and an opening position to open the upper opening of the support bracket 20. On the movable bracket 30 is formed/positioned (herein, i.e., installed/fastened/attached, integrated with) at least one first supporting projection 31 projected from a first plane thereof towards a receiving space of the support bracket 20 at predetermined intervals on the plane. The first supporting projections 31 are inserted into a plurality of screw holes 3a (hereinafter referred to as "first screw holes") provided on one side of the hard disk drive 3 (hereinafter referred to as "a first side") opposite to (facing) the plane of the movable bracket 30, to thereby support the hard disk drive 3. According to an aspect of the invention, the first supporting projections 31 are made so that they can be snug when inserted into the screw holes 3a (and 3b) of the hard disks 3.

Meanwhile, on another plane of the support bracket 20 opposite the first plane of the support bracket 20 and opposite to (facing) the other side of the hard disk drive 3 (hereinafter referred to as "a second side") can be formed at least one second supporting projection 21 projected toward the receiving space of the support bracket 20 at predetermined intervals. The second supporting projection 21 can be inserted into the screw holes 3b (hereinafter referred to as "second screw holes") provided in the second side of the hard disk drive 3 to support the hard disk drive 3 when the hard disk drive 3 is received within the hard disk casing 2. Typically, if the second projections 21 are provided, the hard disks 3 are inserted and/or drawn from the support bracket 20 through the upper opening of the support bracket 20.

The hinge parts 23 and 33 are provided in a region that the support bracket 20 and the movable bracket 30 meet, the hinge parts comprising a pair of hinge pin receiving parts 23 provided at opposite sides of the upper part of the support bracket 20, and a pair of hinge pins 33 formed on the movable bracket 30 corresponding to the hinge pin receiving parts 23. The hinge pins 33 are inserted into the hinge pin receiving parts 23, respectively to allow movement of the movable bracket 30 between the closing position to close the upper opening of the support bracket 20 and the opening position thereof.

Although, in the example embodiment the hinge pin receiving parts 23 are provided in the support bracket 20 and the hinge pins 33 are provided in the movable bracket 30, the present invention is not limited to such a configuration and the positions thereof can be changed according to other known techniques to allow movement of the support bracket 20. For example, a pair of passing holes can be formed on the movable bracket 30 and the support bracket 20 respectively, which may be movably combined (engaged) by screws or bolts.

In FIG. 4, the hard disk casing 2 further comprises locking parts 24 and 34 installed between the support bracket 20 and the movable bracket 30, locking and unlocking the movable bracket 30 relative to the support bracket 20. The locking parts 24 and 34 comprise a first coupling piece 34 extended from an edge of the movable bracket 30 towards the support bracket 20 and having a hooking portion 34a (e.g., a hole, a recess, etc.) formed on the first coupling piece 34, and a second coupling piece 24 installed on an outside-facing plane of the support bracket 20 and having an engagement rib 24a to be engaged with the hooking portion 34a.

The hooking portion 34a provided in the first coupling piece 34 is engaged with the engagement rib 24a provided in the second coupling piece 24 at the closing position of the movable bracket 30, thereby preventing the upper opening of the support bracket 20 from being opened by an arbitrary movement of the movable bracket 30 relative to the support bracket 20. A plane of the second coupling piece 24 on which the engagement rib 24a is provided is attached to the outside-facing plane of the support bracket 20 by a plurality of bolts 29, by welding, pressing, etc.

According to an aspect of the invention, the hooking portion 34a is formed by a passing hole provided transversely in an extended direction of the first coupling piece 34. The first and/or the second coupling pieces 24 and/or 34 are elastic so as to be bent, thereby allowing the hooking portion 34a to be released from the engagement rib 24a. In particular, typically the first coupling piece 34 can be bent to release the hooking portion 34a from the engagement rib 24a.

Alternatively, a releasing passing hole 25 may be formed on the outside-facing plane of the support bracket 20 in the region that the hooking portion 34a is engaged with the engagement rib 24a. In particular, the second coupling piece can be pressed towards the releasing passing hole 25, thereby allowing the engagement rib 24a to be released from the hooking portion 34a. The releasing passing hole 25 accommodates easy locking and unlocking of the locking parts 24 and 34.

The hard disk casing 2 may further comprise at least one buffering member 70 installed on a region of the movable bracket 30 contacting the first and second sides of the hard disk drive 3. With this, noise generated by contact of the hard disk drive 3 and the movable bracket 30 due to vibration generated by operation of the computer can be prevented.

Typically, the buffering member 70 is formed of a bar-shaped rubber. According to an aspect of the invention, the buffering member 70 is formed with projection through holes 71 at the same intervals as the intervals of the first supporting projection 31, so that, using the first side of the hard disk as the example, the first supporting projection 31 passes through the projection through holes 71 when attached to the movable bracket 30. Also, a size of the projection-through hole 71 is formed smaller than that of the first supporting projection 31 so that the projection through hole 71 tightly receives the first supporting projection 31, thereby being capable of attaching the buffering member 70 to the first supporting projection 31 without use of an adhesive member.

Further, a grip (e.g., a handle, a knob, etc.) 35 may be formed on the moving bracket 30 of the hard disk casing 2, allowing opening and closing of the moving bracket 30. For example, when a user desires to move the moving bracket 30, the user can hold the grip 35, to thereby easily move the movable bracket 30. In FIGS. 4 and 5, the grip 35 can be extended outside from the plane of the moving bracket 30. However, the present invention is not limited to such a grip configuration and a finger hole (not shown) can be provided in the plane of the movable bracket 30, so that the user can insert a finger into the finger hole (not shown) so as to move the moving bracket 30.

In FIGS. 4 and 5, the hard disk casing 2 may further comprise at least one first supporting rib 32 projected towards the receiving space of the support bracket 20 from the plane of the movable bracket 30, thereby contacting the plane of the hard disk drive 3 at the closing position of the movable bracket 30 so as to support further the hard disk drive 3. In particular, when the movable bracket 30 is moved to the closing position, the first supporting rib 32 pushes a side of the hard disk drive so that the first supporting projection 31 can be securely inserted and remain inserted into the first screw hole 3a of the hard disk drive 3.

The first supporting rib 32 may further comprise a guiding skirt part 32a bent outwardly from a free end part of the first supporting rib 32. When the movable bracket 30 is moved to the closing position, the guiding skirt part 32a prevents the free end part of the first supporting rib 32 from interfering with a side of the hard disk drive 3.

On other inside plane of the support bracket 20 opposite of the movable bracket 30 can be provided at least one second supporting rib 22 opposite to the at least one first supporting rib 32 of the movable bracket 30, which contacts the hard disk drive 3, thereby supporting the hard disk drive 3 more stably.

According to an embodiment of the invention, a process of installing the hard disk received in the support bracket 20 (i.e., installation of the hard disk casing 2) on the main cabinet 13 is as follows. In a state that the movable bracket 30 opens the upper opening of the support bracket 20, the hard disk drive 3 is inserted into the upper opening of the support bracket 20, and the second supporting projection 21 provided on the other inside-plane of the support bracket 20 is inserted into the second screw hole 3b provided in the hard disk drive 3.

Position of the hard disk drive 3 may be controlled (secured) by moving the movable bracket 30 to the closing position. In particular, by pushing on the grip 35 of the movable bracket 30, at the same time the first supporting projection 31 is inserted into the first screw hole 3a provided in the hard disk drive 3, thereby securing the hard disk 3. Further, the first supporting rib 32 provided on the plane of the movable bracket 30 is slid on one side of the hard disk drive 3 to guide the hard disk drive 3 when the movable bracket 30 is moved, to thereby allow the first supporting projection 31 to be inserted into the first screw hole 3a.

If the movable bracket 30 is pressed to the closing position under a condition that the first supporting projection 31 is inserted in the first screw hole 3a, the movable bracket 30 can be locked into the support bracket 20 at the closing position using the first and second coupling pieces 24 and 34, as follows. The engagement rib 24a provided in the support bracket 20 can be engaged with the hooking portion (for example, a passing hole) 34a of the first coupling piece 34 provided in the movable bracket 30, thereby completing the installation of the hard disk drive 3.

Conversely, to detach the hard disk drive 3 from the hard disk casing 2, typically the engagement rib 24a is pressed through the releasing-through hole 25 to elastically bend the second coupling piece 24 and release the engagement rib 24a, from the passing hole 34a, and at the same time, the movable bracket 30 is opened by pulling the grip 35 and then detaching the hard disk drive 3 from the support bracket 20 through the upper opening of the support bracket 20.

Figure 6:
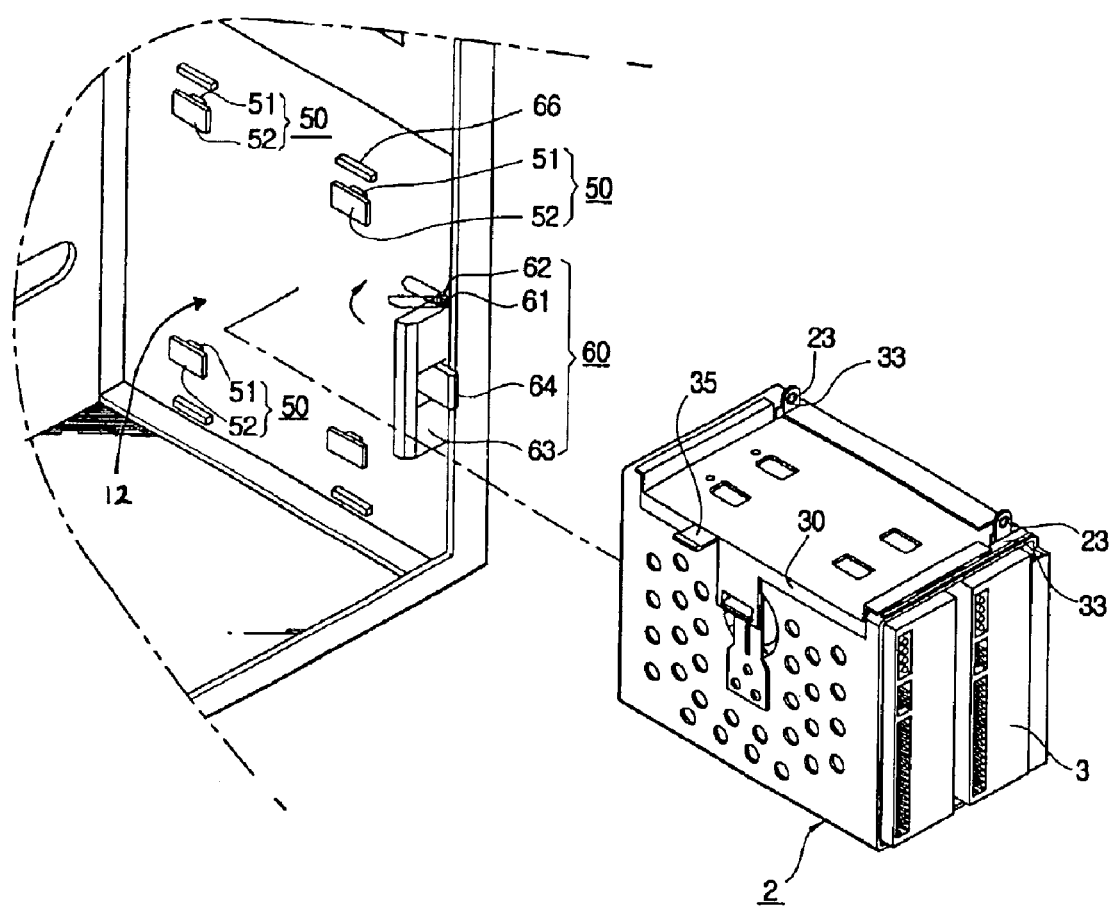
FIG. 6 is a diagram showing the hard disk drive casing of FIG. 3 mounted on a main cabinet of a computer, according to an embodiment of the present invention.
Figure 7:
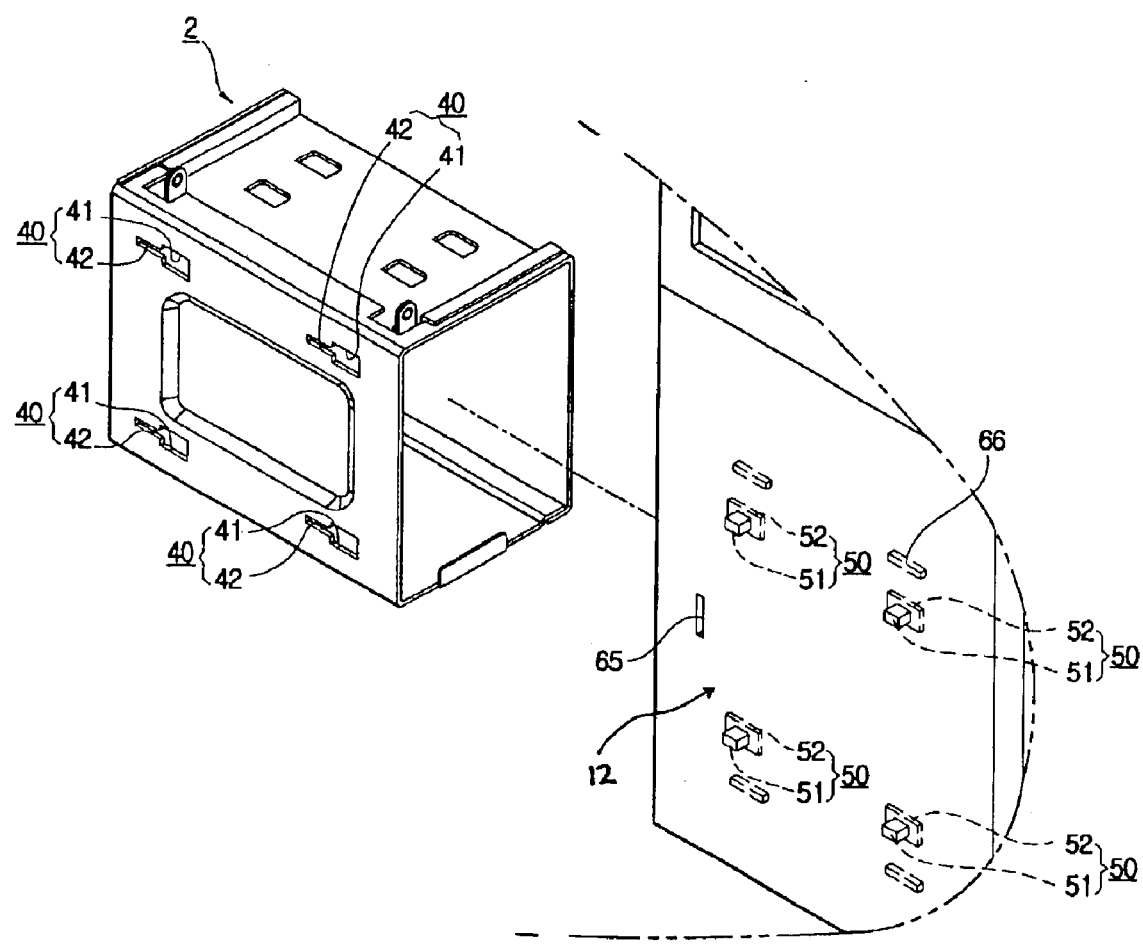
FIG. 7 is a rear view of FIG. 6.

FIG. 6 is a state diagram showing the hard disk drive casing of FIG. 3 mounted on the main cabinet 13, according to an embodiment of the present invention, and FIG. 7 is a rear view of FIG. 6. As shown therein, the computer according to the present invention may further comprise at least one hooking part 50 installed on an inside plane of the main cabinet 13, such as an inside plane of the front panel 12 of the main cabinet 13, and at least one hooking hole 40 formed on a plane of the support bracket 20 of the hard disk casing 2 to receive the hooking part 50, thereby allowing the support bracket 20 to be slid to an installation position on the main cabinet 13 (i.e., the hard disk casing 2 is installed in the main cabinet 13 of the computer). The computer comprises further, a stopper 60 installed on the front panel 12, supporting (e.g., preventing, allowing) the sliding movement of the support bracket 20 at the installation position of the support bracket 20.

The hooking part 50 comprises flange supporting parts 51 projected from the inside plane of the main cabinet 13, such as the inside plane of the front panel 12, and installed along (projecting along) a sliding direction of the support bracket 20, and flange parts 52 extended transversely to the sliding direction of the support bracket 20 from the flange supporting parts 51. Typically, four hooking parts 50 are provided and arranged on the inside plane of the front panel 12 in a rectangular form/shape corresponding to shape of the support bracket 20, so as to mount the hard disk casing 2 in a stable manner.

Like the hooking parts 50, four hooking holes 40 are provided on the plane of the support bracket 20 at positions corresponding to the hooking parts 50 in a rectangular form. Each hooking hole 40 has a flange inserting hole 41 through which the flange part 52 of the hooking part 50 is inserted, and a flange hooking hole 42, extended to the sliding direction of the support bracket 20 from the flange inserting hole 41, to engage the flange part 52 after the support bracket 20 is slid to the installation position of the support bracket 20.

Figure 8A:
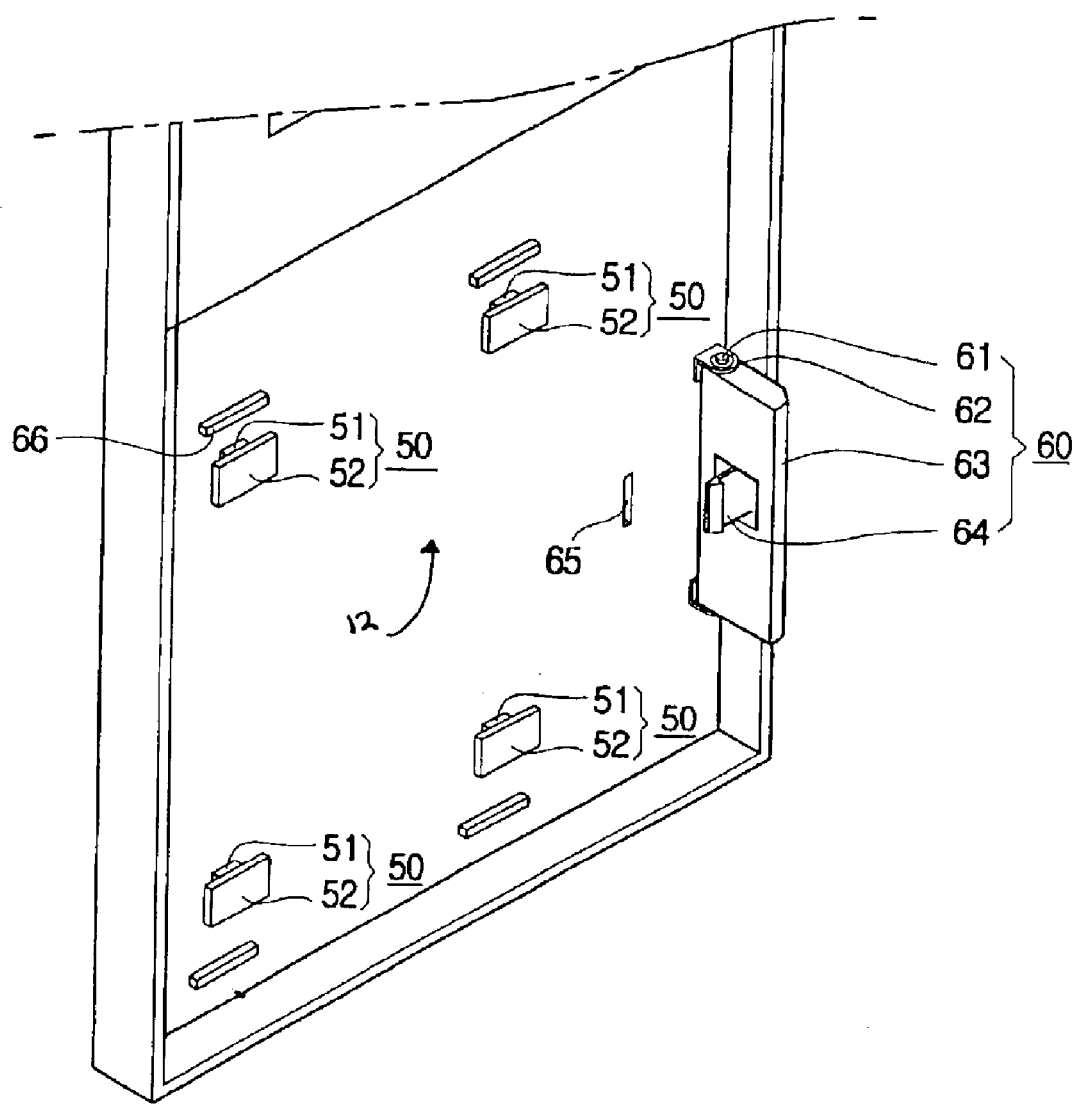
FIGS. 8A and 8B are diagrams showing operations of a stopper when the hard disk casing of FIG. 3 is mounted as shown in FIG. 6, according to an embodiment of the present invention.
Figure 8B:
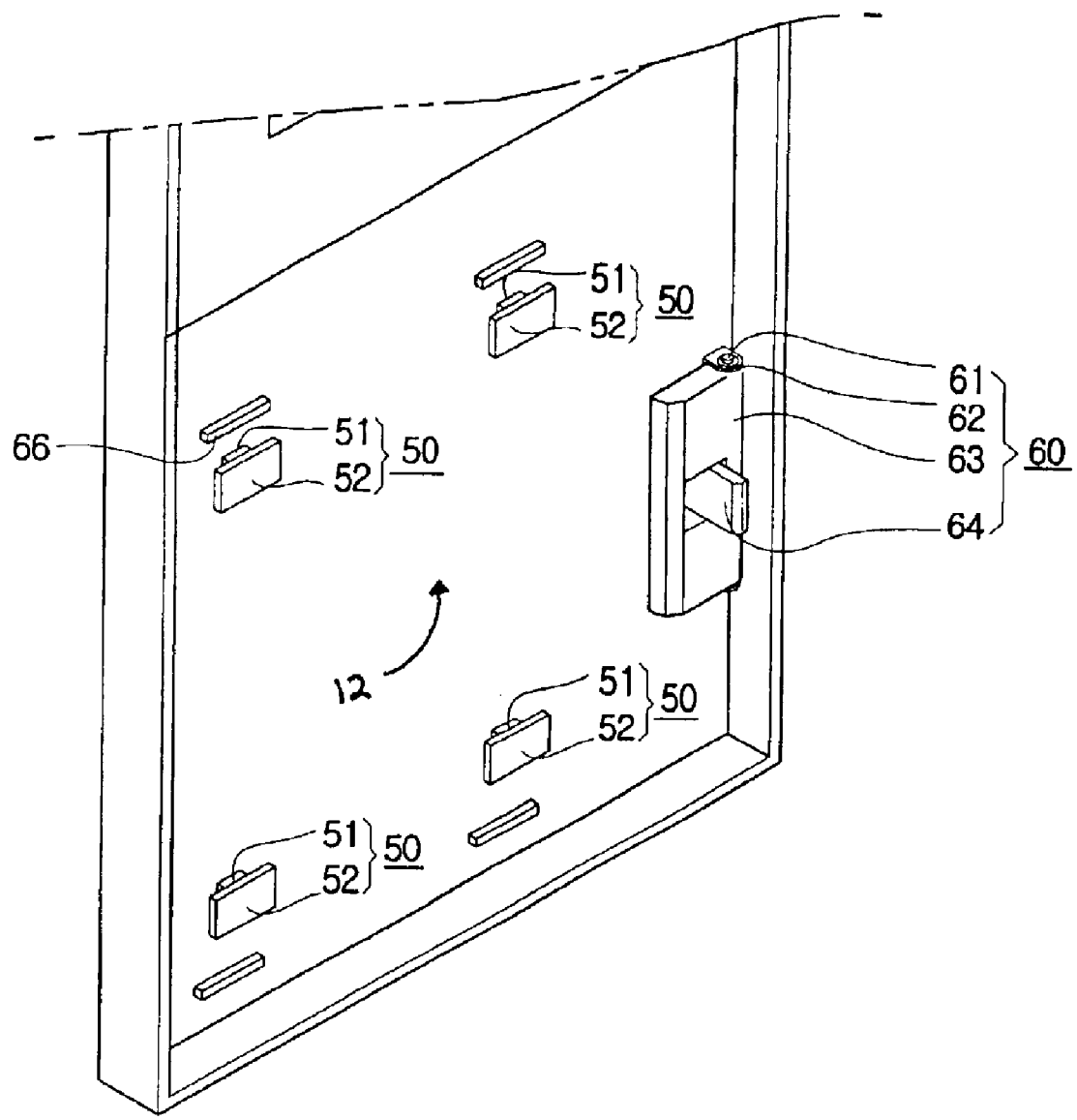

The stopper 60, as illustrated in FIGS. 8A and 8B, comprises a bracket-supporting plate 63 installed adjacent to the rectangular area of the hooking parts 50 (in the right of FIG. 8A) and contacting a back side of an installed support bracket 20 (a contacting position) to prevent the support bracket 20 from being slid backwardly, and rotation-supporting parts 61 and 62 rotatably supporting the bracket supporting plate 63 between a contacting position where the bracket supporting plate 63 contacts the installed support bracket 20 and a separating position where the bracket supporting 63 is separated from the support bracket 20.

The rotation supporting parts 61 and 62 comprise a pair of movable pins 61 provided in the bracket supporting plate 63, and pin receiving parts 62 projected from the inside plane of the main cabinet 13, supportably receiving the movable pins 61 in a movable manner. The movable pins 61 are installed on opposite sides of the bracket supporting plate 63, and through holes (not shown) are formed on planes of the pin receiving parts 62 to receive the movable pins 61 therein.

The stopper 60 may further comprise a hook part 64 projected towards the inside plane of the main cabinet 13 from the bracket supporting plate 63 and locked into a hook-coupling hole 65 formed adjacent to the rectangular area of the hooking parts 50 on the inside plane of the main cabinet 13. In particular, when the bracket supporting plate 63 is moved to the contacting position, the hook part 64 is engaged with the hook-coupling hole 65, thereby allowing the bracket supporting plate 63 to stay at the contacting position.

Further, adjacent to the rectangular area of the hooking parts 50 on the inside plane of the main cabinet 13 may be formed guide ribs 66 guiding the sliding of the hard disk casing 2 by contacting both sides of the support bracket 20 when the support bracket 20 is slid to the installation position. Further, the guide ribs 66 can support both sides of the support bracket 20 after the support bracket 20 is slid to the installation position.

According to an embodiment of the invention, a process of installing the hard disk casing 2 on the main cabinet 13 is described below. Under a state that the bracket supporting plate 63 of the stopper 60 is in the separating position, the support bracket 20 is positioned so as to allow the flange part 52 of the hooking part 50 provided in the main cabinet 13 to be inserted into the flange inserting hole 41 of the hooking hole 40 provided on the plane of the support bracket 20. Then, the support bracket 20 is slid so that the flange part 52 of the hooking part 50 is hooked (engaged) with the flange hooking hole 42. Then, the bracket supporting plate 63 of the stopper 60 is rotated to the contacting position to allow the bracket supporting plate 63 to contact the support bracket 20, thereby completing the installation of the hard disk casing 2.

Conversely, when the hard disk casing 2 is separated (withdrawn) from the main cabinet 13, it may be performed in a reverse order to the installation process.

The present invention is not limited to the above-described example embodiments as follows. For example, in the above-described embodiments, a single hard disk drive 3 is received in the hard disk casing 2. However, a plurality of hard disk drives 3 can be received in the hard disk casing 2. Further, in FIGS. 3 through 7, the hard disk drive 3 is received in the hard disk casing 2 vertically. However, the hard disk drive 3 can be received in the hard disk casing 2 horizontally. Further, in FIGS. 3 through 7, the hard disk casing 2 is mounted on the front panel 12 of the main cabinet 13. However, the hard disk casing 2 can also be mounted to the rear panel 15 or the support panel 16.

According to the present invention, by providing the hard disk casing 2, which comprises the movable bracket 30 provided with the first supporting projection 31, and the support bracket 20 provided with the second supporting projection 21, the hard disk drive 3 can be easily mounted on or separated from the hard disk casing 2. Also by providing the hooking hole 40, the hooking part 50 and the stopper 60, the hard disk casing 2 can be more easily mounted on or separated from the main cabinet 13. Therefore, as described above, the present invention provides a computer allowing easy and quick mounting or removal of hard disk drives from a main cabinet of the computer. In particular, according to the invention, hard disks can be mounted without fastening tools (e.g., screw driver) or without screws or without other fastening means loose/separate from the main cabinet of the computer and/or from the hard disk casing. Advantageously, although the hard disk casing 2 can be used with known/existing hard disk cabinet configurations having mounting screw holes/hollow cylinders, the hard disk casing 2 can be used with a hard disk cabinet configuration having non-threaded mounting holes/hollow cylinders that can also snugly receive the projection supports 31 and 21. Further, the locking parts 24 and 34 can be according to other known configurations.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer having a hard disk drive, comprising:
   a main cabinet
   a hard disk casing comprising a support bracket and a movable bracket, the support bracket removably installable on the main cabinet and comprising an opening for receiving at least one hard disk drive and four walls having an interior opening, and the movable bracket closing at least a part of the interior opening in the first wall;
   a hinge part movably supporting the movable bracket relative to the support bracket; and
   at least one first supporting projection projected from a plane of the movable bracket and inserted into at least one first screw hole provided in a first side of the hard disk drive at a closing position of the movable bracket to support the hard disk drive.

2. The computer according to claim 1, further comprising a locking part installed between the support bracket and the movable bracket, locking and releasing the movable bracket relative to the support bracket.

3. The computer according to claim 2, wherein the locking part comprises:
   a first coupling piece extended towards the support bracket from an edge of the movable bracket and having a hooking portion on the first coupling piece; and
   a second coupling piece with an engagement rib installed on the support bracket, the engagement rib engaging the hooking portion at the closing position of the movable bracket.

4. The computer according to claim 3, wherein the hooking portion is a through hole.

5. The computer according to claim 3, wherein a releasing through hole is provided on a plane of the support bracket at a region that the hooking portion and the engagement rib engage each other, and at least one of the first coupling piece or the second coupling piece is elastically bent towards the releasing-through hole so as to release the hooking portion from the engagement rib.

6. The computer according to claim 2, further comprising at least one second supporting projection projected from a plane of the support bracket and inserted into a second screw hole provided in a second side of the hard disk drive, further supporting the hard disk drive.

7. The computer according to claim 6, further comprising buffering members provided in respective regions that the movable bracket and the support bracket contact the first and the second sides of the hard disk drive.

8. The computer according to claim 7, wherein each buffering member is made of rubber.

9. The computer according to claim 7, further comprising a grip installed on the movable bracket, the grip accessible by a user to aid in moving the movable bracket.

10. The computer according to claim 9, further comprising at least one supporting rib installed on the movable bracket, supporting in a contact manner the hard disk drive at the closing position, each supporting rib comprising a guiding skirt bent outwardly from a free part thereof, to prevent the free end of the supporting rib from interfering with a side of the hard disk drive.

11. A computer in which a hard disk drive is mountable, comprising:
   a main cabinet;
   a hard disk casing having a support bracket and a movable bracket, the support bracket removeably installable on the main cabinet and having an opening for receiving at least one hard disk drive, and the movable bracket closing at least a part of the opening of the support bracket;
   a hinge part movably supporting the movable bracket relative to the support bracket;
   at least one first supporting projection projected from a plane of the movable bracket and insertable into at least one first screw hole provided in a first side of the hard disk drive at a closing position of the movable bracket to support the hard disk drive;
   a hooking part installed on a plane of one of the support bracket and the main cabinet;
   a hooking hole formed on a plane of one of the support bracket and the main cabinet, corresponding to the hooking part and receiving the hooking part, allowing the support bracket to be slidably engaged into an installation position thereof relative to the main cabinet; and
   a stopper installed on the main cabinet and rotatable to prevent sliding of the support bracket after the support bracket is positioned at the installation position.

12. The computer according to claim 11,
   wherein the hooking part is installed on the main cabinet and comprises a flange supporting rib installed along a sliding direction of the support bracket and a flange part extended from the flange supporting rib transversely to the sliding direction of the support bracket, and
   wherein the hooking hole is formed on the support bracket and comprises a flange insertion hole formed on the support bracket, through which the flange part is insertable, and a flange engaging hole extended from the flange insertion hole in the sliding direction of the support bracket, allowing the support bracket to be slid and engaged with the flange part.

13. The computer according to claim 11, wherein the stopper comprises:
   a bracket supporting plate in a contact position with the support bracket at the installation position, thereby preventing sliding of the support bracket; and
   a rotation supporting part rotatably supporting the bracket supporting plate between the contact position of the bracket supporting plate and a separating position thereof.

14. The computer according to claim 13, wherein the stopper further comprises:
   a hook part projected towards the main cabinet from the bracket supporting plate; and
   a hook-coupling hole formed on the main cabinet and being engaged with the hook part at the contact position of the bracket supporting plate.

15. A computer having a main cabinet to which a hard disk drive is mounted, comprising:
   a hard disk casing having an opening and receiving therein at least one hard disk drive;
   a hooking part installed on a plane of one of the hard disk casing and the main cabinet;

a hooking hole formed on a plane of one of the hard disk casing and the main cabinet, corresponding to the hooking part and receiving the hooking part, thereby allowing the hard disk casing to slide to an installation position on the main cabinet; and a stopper installed on the main cabinet and rotatable to prevent sliding of the hard disk casing after the hard disk casing is slid to the installation position.

16. The computer according to claim 15, wherein the hooking part is installed on the main cabinet and comprises a flange supporting rib installed in a sliding direction of the hard disk casing and a flange part extended from the flange supporting rib transversely to the sliding direction of the hard disk casing, and wherein the hooking hole is formed on the hard disk casing and comprises a flange insertion hole, through which the flange part is insertable, and a flange engaging hole extended from the flange insertion hole in the sliding direction of the hard disk casing, allowing the hard disk casing to be slid and engaged with the flange part.

17. The computer according to claim 15, wherein the stopper comprises:

a bracket supporting plate in a contact position with the hard disk casing at the installation position of the hard disk casing, thereby preventing sliding of the hard disk casing; and a rotation supporting part rotatably supporting the bracket supporting plate between the contact position of the bracket supporting plate and a separating position thereof.

18. The computer according to claim 17, wherein the stopper further comprises:

a hook part projected towards the main cabinet from the bracket supporting plate; and a hook coupling hole formed on the main cabinet and being engaged with the hook part at the contact position of the bracket supporting plate.

19. The computer according to claim 17, wherein the rotation supporting part comprises:

a movable pin provided on one of the stopper and the main cabinet; and a movable pin receiving part provided on other of the stopper and the main cabinet, corresponding to and receiving the movable pin so as to allow the stopper to be rotated relative to the main cabinet.

20. The computer according to claim 15, further comprising at least one guide rib installed on the main cabinet and guiding the hard disk casing when the hard disk casing is slid to the installation position.

21. A hard disk casing, comprising:

a support bracket having an opening and receiving at least one hard disk drive, the bracket having a wall opposite the opening and having at least one first supporting projection projected from the wall and insertable in a corresponding hole provided in one side of the at least one disk drive;

a movable bracket movably connected at the opening to close the opening and having at least one second supporting projection projected from the movable bracket towards the opening to support the at least one hard disk drive by being inserted into a second corresponding hole in the at least one hard disk drive at a closing position of the movable bracket; and a buffering member which surrounds at least one of the at least one first and second supporting projections and contacts a corresponding side of the hard disk drive.

22. The hard disk casing according to claim 21, wherein the buffering member is formed with a through hole having a smaller size than the corresponding supporting projection, to attach the buffering member to the corresponding supporting projection.

23. The hard disk casing according to claim 21, further comprising:

first and second locking parts each installed on a plane of the support bracket and a plane of the movable bracket and engaging each other at the closing position, thereby locking the hard disk casing.

24. A method of mounting hard disks on a computer cabinet, comprising:

inserting at least one hard disk through an opening of a support bracket;

closing the opening with a movable bracket movably connected at the opening;

inserting at least one supporting projection, projected towards the opening from the movable bracket and supporting the at least one hard disk drive, into at least one hole provided in sides of the at least one hard disk drive when the opening is closed with the movable bracket; engaging at least one hooking hole of the support bracket with a hooking part of the computer cabinet;

rotating a stopper in a first direction to prevent the hooking part of the computer cabinet and the hooking hole of the support bracket from disengaging; and engaging a hooking part of the stopper with a hooking hole of the computer cabinet to prevent the stopper from rotating in a second direction, opposite the first direction.

25. A computer cabinet, comprising:

a hooking part installed on a plane of the cabinet;

a rotatable stopper installed on the same plane of the cabinet with the installed hooking part; and a hard-disk casing, comprising:

a support bracket having an opening and receiving at least one hard disk drive;

a movable bracket movably connected at the opening to close the opening and having at least one supporting projection projected from the movable bracket towards the opening to support the at least one hard disk drive by being inserted into at least one hole provided in a side of the hard disk drive at a closing position of the movable bracket; and a hooking hole formed on a plane of the hard disk casing and receiving the hooking part, thereby allowing the hard disk casing to slide into an installation position on the cabinet and the stopper to be rotated to contact the installed hard disk casing and preventing further sliding of the hard disk casing.

26. A hard-disk casing for a computer cabinet, comprising:

a support bracket receiving a hard disk drive through an opening;

a bracket movably connected at the opening to close the opening and having a supporting projection at a closing position of the bracket; and a hooking hole formed on a plane of the hard disk casing and receiving a hooking part of the computer cabinet, thereby allowing a stopper to be rotated to contact an installed hard disk casing.

* * * * *